United States Patent [19]

Winegeart

[11] Patent Number: 4,519,576

[45] Date of Patent: May 28, 1985

[54] OIL WELL SAFETY VALVE FOR USE WITH DRILL PIPE

[76] Inventor: Mitchell E. Winegeart, 4512 Hessmer Ave., Metairie, La. 70002

[21] Appl. No.: 561,647

[22] Filed: Dec. 15, 1983

[51] Int. Cl.³ ............................................ F16K 31/143
[52] U.S. Cl. ....................................... 251/62; 251/58; 166/321; 166/323
[58] Field of Search .................... 251/58, 62, 309, 281, 251/283, 215, 63; 166/321, 322, 323, 324; 92/138

[56] References Cited

U.S. PATENT DOCUMENTS

| | | | |
|---|---|---|---|
| 3,092,131 | 6/1963 | Brown et al. | 251/62 |
| 3,509,913 | 5/1970 | Lewis | 251/58 |
| 3,747,618 | 7/1973 | Boes | 251/58 |
| 3,941,348 | 3/1976 | Mott | 251/58 |
| 3,995,827 | 12/1976 | Piquet | 251/58 |
| 4,073,465 | 2/1978 | Sheppard | 251/58 |
| 4,262,693 | 4/1981 | Giebeler | 251/58 |
| 4,316,596 | 2/1982 | Krober et al. | 251/58 |
| 4,377,179 | 3/1983 | Giebeler | 166/323 |
| 4,378,931 | 4/1983 | Adams, Jr. | 251/94 |

FOREIGN PATENT DOCUMENTS 2255376  2/1974  Fed. Rep. of Germany ........ 251/62

*Primary Examiner*—Samuel Scott
*Assistant Examiner*—H. A. Odar
*Attorney, Agent, or Firm*—Charles C. Garvey

[57] ABSTRACT

A drill string safety valve operator provides a rotatable tubular body having a longitudinal through bore for conveying fluids. A valve member is movably disposed within the body for valving the fluid flow through the bore. A crank arm extends from and is coupled to the valve member at the valve stem for moving the valve member between open flow and closed flow positions responsive to rotation of the crank arm. A bearing is carried at the outboard end of the crank arm for transmitting load to the crank arm. An annular ring is supported about the tubular housing and provides a surface that can engage the bearing. Hydraulic cylinders power the annular ring so that the annular ring engages the bearing. Downward movement of the ring causes a corresponding downward movement of the bearing and a corresponding rotation of the crank arm. The apparatus thus allows quick remote closure of the valve during a blowout condition of the drill pipe bore.

8 Claims, 9 Drawing Figures

OIL WELL SAFETY VALVE FOR USE WITH DRILL PIPE

BACKGROUND OF THE INVENTION

Technical Field

The present invention relates to oil and gas well drilling and safety valves used in oil and gas well drilling. More particularly, the present invention relates to an improved kelly valve actuator assembly which allows the kelly valve to be opened or closed when the kelly is spinning or still from a remote location.

General Background

In the oil and gas well drilling industry, a powered rotary table rotates a kelly and a kelly bushing to rotate the drill string at the rig floor. There is commonly employed a valve to close the drill string bore at the rig floor. Such valves are commercially available devices. Some models have patented features. For example, a recent patent is U.S. Pat. No. 4,293,163 which shows certain improvements in the valve stem and seals associated with the valve. Kelly valves are usually manually operated. A socket associated with the valve stem is receptive of a wrench or other such torque imparting tool. Oil rig workers simply rotate a wrench to close or open the valve. By controlling the flow of fluid through the drill string, the kelly valve can be used to prevent in-line blowouts. A problem exists in that rig workers cannot always reach the kelly valve. Sometimes the valve is too high above the rig floor to reach. At other times the kelly valve might be disconnected from the drill string such as during a trip where pipe is being removed from the well (for example, to replace the drill bit).

There have been some attempts to automatically open and close the kelly valve from a remote location. One such device can be seen in U.S. Pat. No. 3,887,161. In the '161 patent, a plurality of hydraulic cylinders are supported by a plate that attaches to the hydraulic swivel portion of the drilling apparatus. The hydraulic cylinders are all connected to a single annular plate which surrounds the kelly valve. An arc-shaped cam is connected to the valve stem. Expansion and contraction of the hydraulic cylinders causes an annular plate to engage the cam and push on the cam thereby rotating the valve stem to close the valve. The apparatus normally is used when the kelly is not spinning, and in fact is retracted during spinning of the kelly to a withdrawn position.

Another remotely operably kelly valve actuator can be seen in U.S. Pat. No. 3,941,348 issued to Mott entitled "Safety Valve." That device provides a remotely operable safety valve mounted between the swivel and the kelly in drilling operation including a spherically shaped valve element which is mounted in a tubular housing rotatable with a swivel sub, the kelly and the drill string. Hydraulic cylinders move the valve element between open and close positions in order to control flow through the drill string and prevent in-line blowouts. As an additional safety feature, a spring moves the valve element to a closed position in the event of a failure of the hydraulic means. The Mott patent uses an annular channel which is connected to a rack. The rack engages pinion gears which are associated with the valve stem. Hydraulic cylinders use an annular ring which supports a plurality of space roller bearings that engage the channel. When the hydraulic cylinders expand, the bearings connected to the ring which is moved by the cylinders engages the channel which forces the racks to move so that the pinion gears are rotated. The Mott patent uses a complex linkage which is maintenance prone and which relies upon a large sequence of extraneous linkage members to insure proper operation.

General Discussion of the Present Invention

The present invention provides a kelly operator which includes a rotatable tubular housing having a longitudinal through bore for conveying fluids. A valve member movably disposed within the housing valves fluid flow through the bore. In the preferred embodiment, the rotatable tubular housing and the valve member can, in fact, be the body and valve element of a conventional kelly valve. A crank arm extends from and is coupled to the valve member. The crank arm angularly connects with the valve member and extends outwardly therefrom. The crank arm is rotated during operation so as to close and open the bore. A bearing is carried by the crank arm outer end for transmitting load to the crank arm. An annular ring is supported about the tubular housing and has at least a surface which can engage the bearing for quickly moving the crank arm to a closed position by transmitting load to the bearing. A plurality of powered hydraulic cylinders at least partially support the annular ring in a position about the housing and move the annular ring linearly with respect to the housing between upper and lower positions. Movement of the hydraulic cylinders can thus effect a quick closing during a blowout condition of the bore. The crank arm includes a drive shaft member which is connectable to the valve member and a crank arm connected at one end to the drive shaft and extending therefrom. The drive shaft axis and the arm axis form an angle so that the bearing portion of the crank arm aligns with the annular ring. In the preferred embodiment, the angle between the drive shaft axis and the arm axis form an obtuse angle. In the preferred embodiment, the tubular valve body provides box and pin end connectors for attaching the tubular valve body to the top of the drill string, or to the kelly or to the hydraulic swivel, as desired. A housing is supported with respect to the valve body by supports. The crank arm extends from the valve member and rotates with the valve member while the housing carries the hydraulic pistons and the annular ring with the channel. Thus, the valve body, a valve member, and crank arm can rotate while the housing, hydraulic cylinders, and annular ring with channel do not. Since the annular ring provides a load transfer surface which is annular (being radially projected about the body), no matter what position the crank arm and valving member assume, the annular ring will always be able to abut the crank arm and effect a closure by transferring load thereto. Thus in a flow out condition, remote closure of the bore is possible to prevent a blowout condition.

BRIEF DESCRIPTION OF THE DRAWINGS

For a further understanding of the nature and objects of the present invention, reference should be had to the following detailed description, taking in conjunction with the accompanying drawings, in which like parts are given like reference numerals and wherein.

DETAILED DESCRIPTION OF THE PRESENT INVENTION

Figure 1:
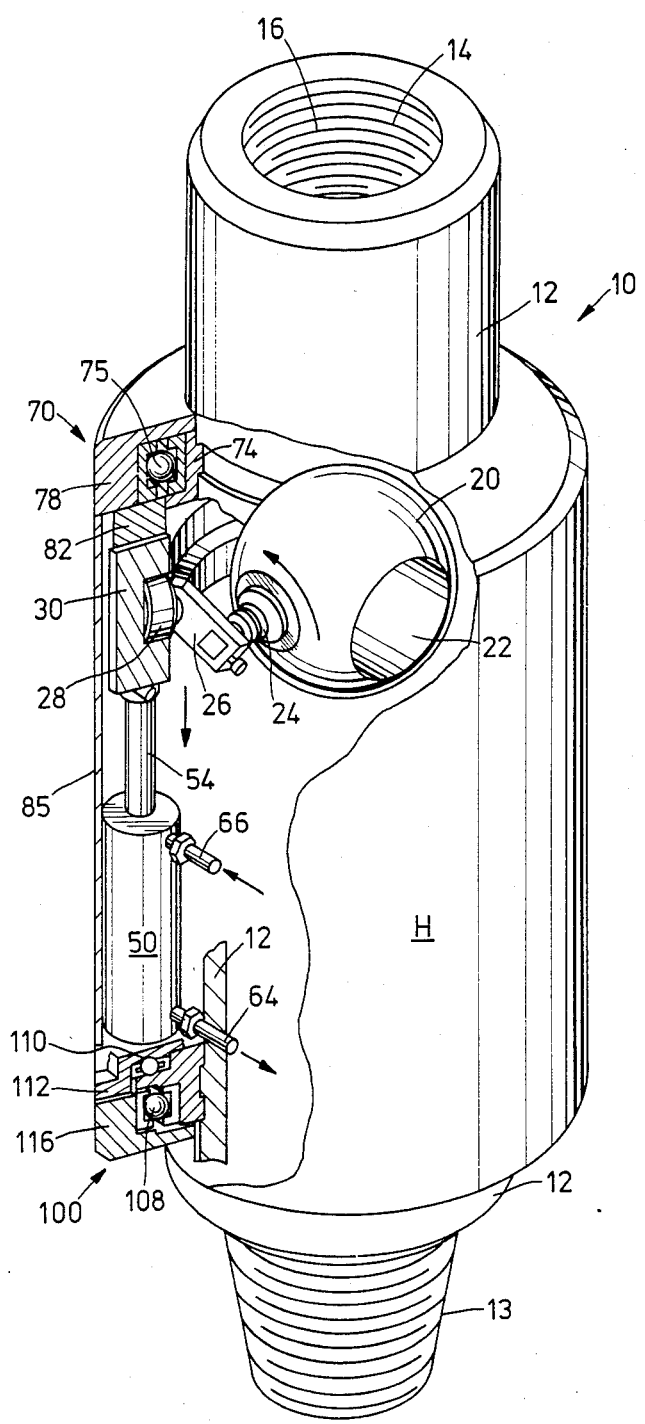
FIG. 1 is a perspective fragmentary view of one embodiment of the apparatus of the present invention.
Figure 2:
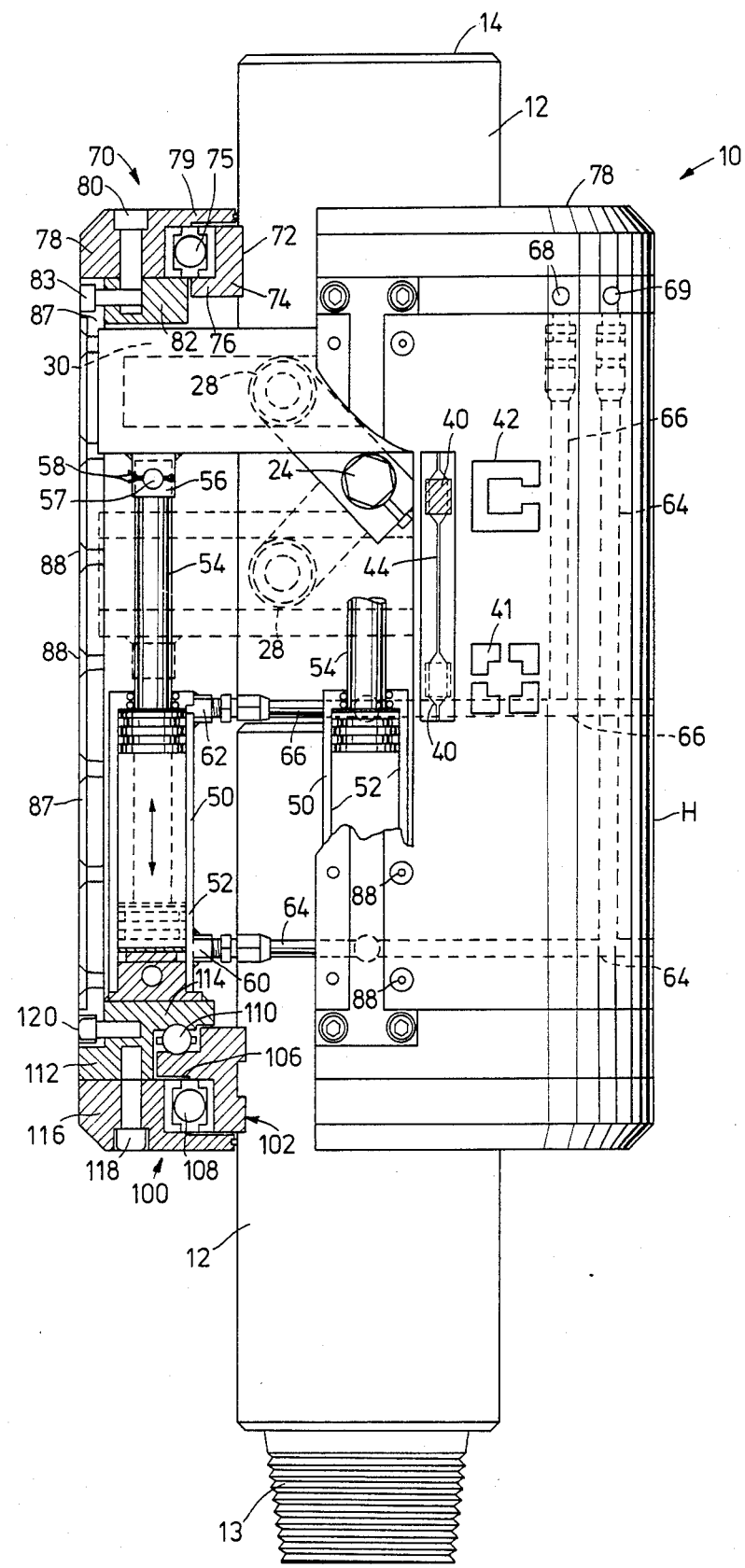
FIG. 2 is an elevational view of one embodiment of the apparatus of the present invention.

FIGS. 1 and 2 best illustrate the preferred embodiment of the apparatus of the present invention designated generally by the numeral 10. Kelly valve actuator 10 provides a valve body 12 having a pin end 13 and a boxed end 14. A longitudinal through bore 16 allows fluid to flow through body 12. A generally spherical valve member 20 is disposed and supported within body 12 and rotates between open and closed flow positions so as to be able to valve bore 16. Valve member 20 likewise provides a longitudinal bore 22 which aligns with bore 16 during the open flow condition. Shaft 24 connected to a valve member can be rotated from the exterior of valve body 12.

A crank arm 26 connects with shaft 24 of valve member 20. Crank arm 26 as will be described more fully hereinafter is moved in a rotational direction so that it opens and closes the bore 16 of valve body 12. The outboard end portion of crank arm 26 provides a bearing 28 which can rotate. Load is transferred to crank arm 26 through bearing 28 by means of annular ring 30.

Figure 3:
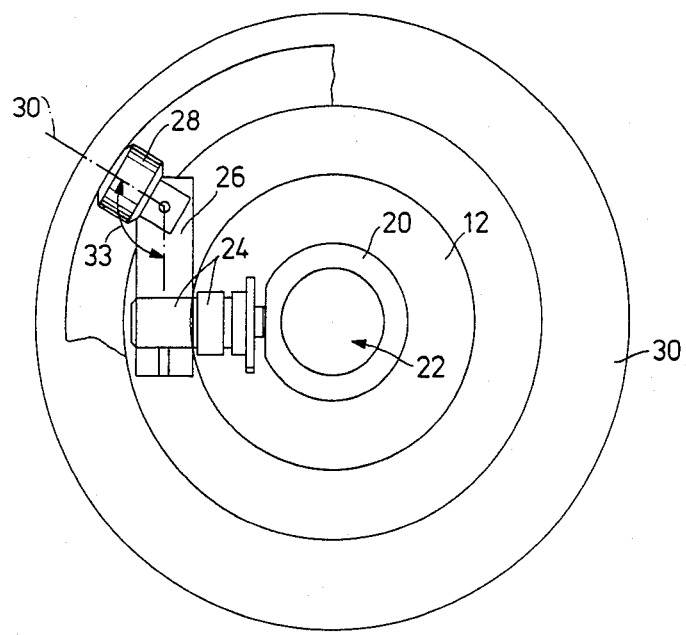
FIG. 3 is a horizontal sectional view of the first embodiment of the apparatus of the present invention.
Figure 4:
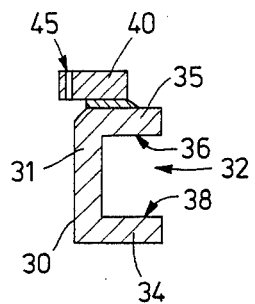
FIG. 4 is a fragmentary sectional view of the annular ring of the first embodiment of the apparatus of the present invention.
Figure 5:
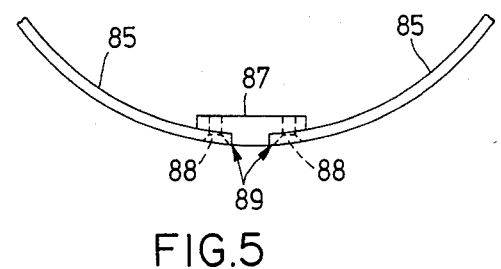
FIG. 5 is a horizontal sectional fragmentary view of the housing cover portion of the first embodiment of the apparatus of the present invention.

Annular ring 30 is generally C-shaped in section (see FIG. 4). Ring 30 provides a recess 32 which is defined by web 31, lower flange 34 and upper flange 35. Each flange 34, 35 provides a surface 36, 38 which can transfer load to bearing 28 of crank arm 26. In FIG. 3, curved arrow 33 indicates the angle between the axis of crank arm 26 and the axis of bearing 28. This angle 33 is preferably an obtuse angle, i.e. greater than 90°. Recess 32 faces inwardly so that bearing 28 communicates with and occupies recess 32. The outer curve surface of bearing 28 thus can abut either surface 36 of flange 35 or surface 38 of flange 34 depending on whether the valve is being opened or closed. In FIGS. 2 and 4, 40 designates a manual lift-eye having an opening therethrough which can be engaged by a chain, shackle, or the like. Thus, if hydraulic power is lost, valve member 20 can be manually opened or closed by lifting or pulling down upon lift-eye 40. In FIG. 2, there can be seen schematic illustrations in the form of O 41 and C 42 illustrating clearly to an operator the closed and open positions of valve member 20 and thus bore 16. An elongated slot 44 allows lift-eye 40 to move freely between the open and closed positions. A lift-eye opening 45 in lift-eye 40 allows a chain, hook, or the like to be attached thereto.

A plurality of hydraulic cylinders 50 are mounted upon housing H. The hydraulic cylinders 50 expand and contract when they are supplied with or emptied of hydraulic fluid. Each hydraulic cylinder provides a cylinder body 52 and push rod 50, the push rod being a movable portion of the entire assembly. A plurality of brackets 56 attach each push rod 54 to annular ring 30. Brackets 56 can be welded for example to ring 30 or other such means. An elongated pin 57 secured in place by cotter pin 58 holds the end portion of each push rod 54 to its particular bracket 56.

In FIG. 1, there can be seen a pair of hydraulic ports 60, 62 for supplying and withdrawing hydraulic fluid from cylinder 52. Hydraulic fluid supply line 64, 66 communicate respectively with ports 60, 62. Hydraulic connections 68, 69 allow hydraulic lines to be connected to the entire apparatus 10 for supplying a source of pressurized hydraulic fluid thereto.

Figure 6:
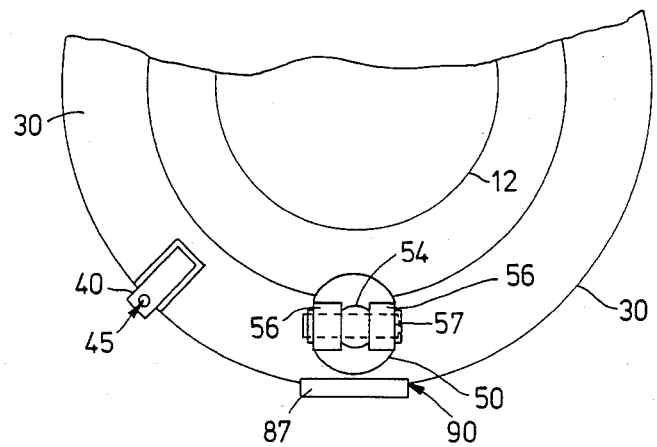
FIG. 6 is another horizontal sectional view of the first embodiment of the apparatus of the present invention illustrating the valve member, the valve body, the housing, the hydraulic cylinders, and the annular ring.

An upper bearing assembly 70 includes annular split ring bearing support 74 which is mounted upon body 12 at annular groove 72. A laterally extending annular flange 76 extends from split ring bearing support 74 so that bearing 75 rests thereupon once assembled. Annular housing support 78 attaches by means of a plurality of bolts 80 to upper housing support ring 82. A plurality of bolts 83 attach housing ribs 87 to upper housing support ring 82. Recesses 89 allow individual quarter section of housing cover 85 to form a continuous cylindrical outer shell. Assembly screws 88 complete the assembly. Ring 30 is grooved so that each of the four ribs 87 acts as a guide for ring 30. In FIG. 6, groove 90 in ring 30 corresponds to and is occupied by rib 87.

Similarly, a lower bearing assembly 100 provides an annular split ring 104 which attaches to housing 12 at a provided annular groove 102 formed in body 12. A laterally extending flange 106 engages ball bearing ring 108. Hydraulic cylinder support ring 112 attaches to lower housing support ring 116 by means of a plurality of assembly bolts 118. Bearings 108, 110 form a connection of hydraulic cylinder support ring 112 and lower housing support ring 116 to laterally extending flange 106 of annular split ring 104. Hydraulic cylinder support ring 112 provides an inwardly extending flange 114 which in combination with the flange 106 of split ring 104 enclose bearing 110.

From the above, it can be seen that housing 12 will rotate and with it rotates certain portions of upper bearing assembly 70 and certain portions of lower bearing assembly 100. Specifically, when body 12 rotates, annular split ring bearing support 74 also rotates. However, annular housing support 78 and upper housing support ring 82 remain still. Similarly, when body 12 rotates, annular split ring 104 rotates with it while hydraulic cylinder support ring 112 and lower housing support ring 116 remain still. Thus, the hydraulic cylinders 50 which are welded to hydraulic cylinder support ring 112 also remain still as do lines 64, 66. Annular ring 30 also remains still during spinning of valve body 12. However, valve body 12 rotates as does crank arm 24 and bearing 28. During rotation, bearing 28 in fact generates a rotational section which is substantially identical to the C-shaped recess 32 of ring 30. When hydraulic cylinders 50 are retracted, ring 30 moves downwardly with push rod 54. When ring 30 moves downwardly with push rod 54, upper flange 35 of annular ring 30 engages bearing 28, transferring load thereto. The phantom lines in FIG. 2 show the lowermost position of annular ring 30 and also the lowermost position of bearing 28. One skilled in the art will see that bearing 28 has been moved downwardly and crank arm 20, 26 has rotated 90°. This effects a closure of bore 22 and of bore 16. In FIG. 1, the uppermost position of annular ring 30 is shown in a cutaway view. Notice that bearing 28 occupies a position within the recess 32 of annular ring 30. Also, crank arm 26 is in the uppermost position as shown in hard lines in FIG. 2. The curved arrow in FIG. 1 illustrates the rotation of stem 24 which will effect a rotation of valve member 20 and a closure of bore 22.

Since lift-eye 40 is connected to ring 30, it will always move therewith. Thus, lift-eye 40 forms a dual function. It firstly can be used to manually move ring 30 between its upper and lower positions if hydraulic power is not available. Secondly, lift-eye 40 functions as an indicator of the position of valve member 20. Thus, the position as shown in FIG. 2 shows the valve to be fully open while the phantom line position shows the valve to be fully closed.

Figure 7:
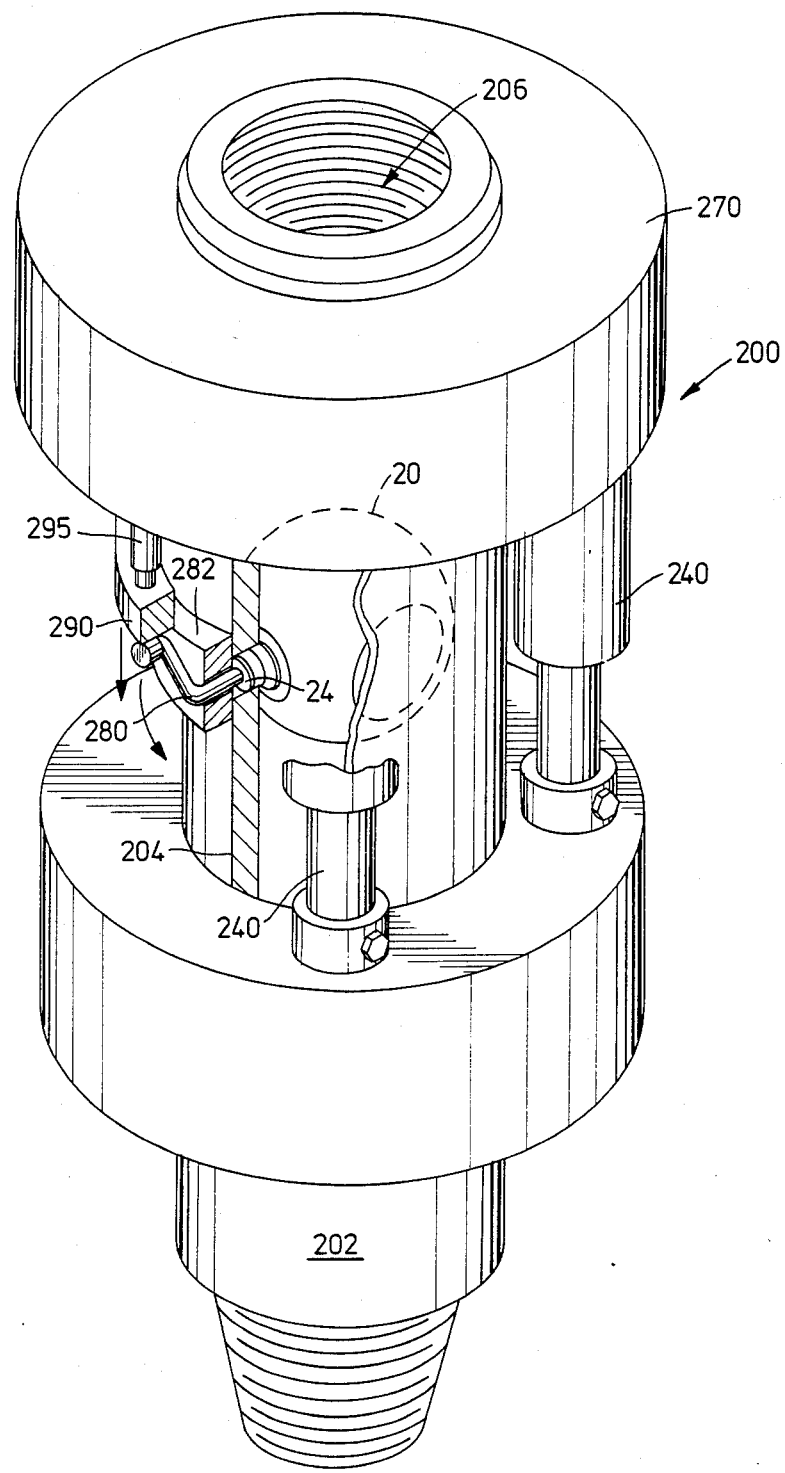
FIG. 7 is a perspective view of the second embodiment of the apparatus of the present invention.
Figure 8:
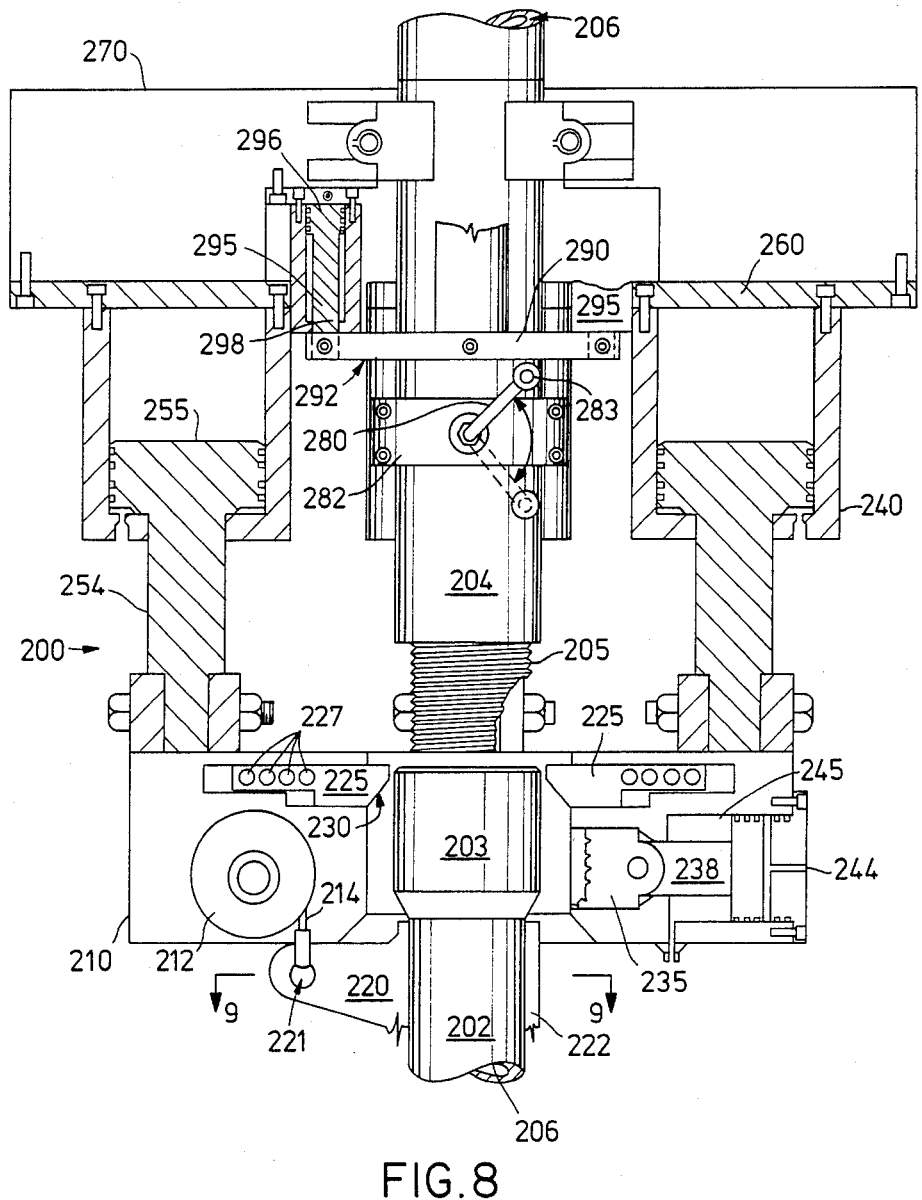
FIG. 8 is a sectional elevational view of the second embodiment of the apparatus of the present invention.
Figure 9:
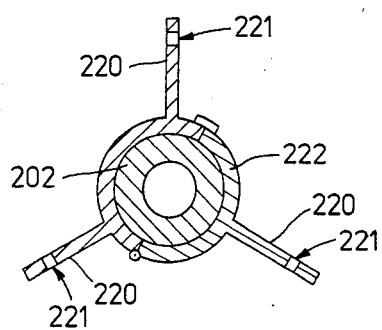
FIG. 9 is a sectional view taken along lines 9—9 of FIG. 8.

FIGS. 7 and 8 illustrate a second embodiment of the apparatus of the present invention which is designated generally by the numeral 200. A first inspection of FIG. 8 shows the uppermost end portion of the drill string and more particularly the last section 202 of drill pipe. Section 202 has a box end 203 which will be made up with tubular valve body section 204 and more particularly the pin 205 end portion thereof, both of which are correspondingly threaded to engage. Tubular valve body section 204 is of substantially the same construction as valve body 12 of the embodiment of FIGS. 1-6, including a valving member, bore and stem. For clarity, description of the valve member and stem are not repeated nor shown in FIGS. 7-8, as they can be seen in FIGS. 1-6 of the drawings. Each section 202, 204 provides a common bore 206 which communicates so that fluid can flow freely therethrough. A housing 210 provides a plurality of radially spaced powered reels 212 each of which has a cable 214 wound thereupon. A plurality of preferably three radial lifting eyes 220 each provide openings 221 for the attachment of cable 214 thereto. Preferably three radial lifting eyes 220 are provided as are a corresponding plurality of three spaced powered reels 212. The reels 212 and lifting eyes 220 radially align so that when load is applied to cables 214 by reels 212, cables 214 are generally vertical and have only vertical load components. Lifting eyes 220 are attached to central lifting sleeve 222 that provides a bore which is slightly larger than the outer diameter of drill pipe section 202 so that sleeve 222 can slide upon section 202 but stops when it engages the enlarged box end 203. Sleeve 222 (see FIG. 9) is a split sleeve so that it can open and close in order to attach or remove from joint 202. A hinge or latch or like connection could secure sleeve 222 about joint 202. Sleeve 222 thus will abut the box 203 end portion of section 202 when reels 212 have fully withdrawn cables 214. This operative position is shown in FIG. 8. Normally the entire actuator 200 is supported by a lift line (not shown) and counterweighted so that rig workers can easily lift the entire actuator 200 into position. The bore 206 of section 202 might in an emergency situation be uncontrollably discharging drilling mud onto the drill rig floor, possibly as a prelude to a blowout condition. Rig workers would first extend cables 214 and then attach sleeve 222 to section 202. The driller would then actuate the reels 212 so that cables 214 would be withdrawn. The actuator would then center itself over the box 203 end of joint 202 and make up the joints 202-204 as more particularly specified hereinafter. Hydraulically operated reels 212 can have ratchets to prevent inadvertent withdrawal of cables 214. Such reels 214 and the switches/controls to operate such reels 214 are commercially available devices.

A plurality of radially spaced guides 225 are mounted upon housing 210 and can slide laterally with respect to pipe section 202. Each guide has a plurality of openings 227 which are receptive of pins or other suitable fasteners so that each guide 225 can be adjusted inwardly and outwardly with respect to the bore 206 of joint 202 and then affixed in the desired position for the size pipe involved. The lowermost surface of each guide 225 has a beveled surface 230 which helps align and center housing 210 upon pipe section 202 when each cable 214 is fully wound upon each reel 212. Pressure switches or other suitable means can be used to actuate jaws 235 when cables 214 are fully withdrawn. The jaws 235 are urged inwardy until each jaw 235 abuts and registers with the box 203 end of section 202. Each jaw is shaped to conform to the shape of the box 203 end of pipe section 202. Piston rods 238 and hydraulic pistons 240 move inwardly responsive to the addition of hydraulic fluid under pressure to orifice 244. Cylinder 245 is preferably cylindrical corresponding in section with cylindrical piston 240. Preferably three radially spaced jaws 235 are provided. Pressure switches can also actuate hydraulic cylinders and hydraulic tongs 270 once jaws 235 are fully positioned against box 203 end of pipe section 202.

In order to engage the pin 205 end portion of section 204 with the box 203 end portion of section 202, a plurality of radially spaced (preferably four) hydraulic piston assemblies 250 connect housing 210 with hydraulic tong support plate 260. Each piston assembly 250 provides a hydraulic cylinder 252 and a pushrod 254 which is connected to a hydraulic piston 255 that occupies cylinder 252. Plate 260 supports a conventional power tong assembly 270 such as is manufactured by Eckels, for example. Power tong 270 has a pair of opposed jaws 272, 273 which can grip and rotate pipe joint 204. Thus when hydraulic pistons 250 pull section 204 until the pin 205 end portion thereof abuts the box 203 end of section 202, rotation of jaws 272, 273 will "make up" the joint by engaging the threaded end portion of pin 205 with a similarly, but female threaded portion of box 203 end of section 202.

After the joint of section 202 and 204 is "made up" and properly torqued by applying sufficient pressure through jaws 272, 273, the bore 206 of sections 202, 204 can be closed. A rotation of crank arm 280 effects a corresponding rotation of an interior valving element which is of the same type as the ball valve element 20 of the embodiment of FIGS. 1 and 2. Crank arm 280 assembly of the embodiment of FIGS. 7 and 8, can be of the same construction as arm 26, stem 24, and bearing 28 of FIGS. 1 and 2.

Crank arm assembly 280 can be supported using clamp 282 so that it will stay in the socket of the valving element. Alternatively, the stem and crank arm assembly 280 could be of an integral construction or of an interlocking construction so that the crank arm would not readily fall from the socket of the valve stem.

An annular ring 290 is supported about section 204 by a plurality of hydraulic pistons 295. The pistons force annular ring 290 downwardly to close the valving element of section 204 and thus bore 206. Ring 290 has a smooth undersurface 292 which transfers load from hydraulic cylinders 295 to roller bearing 283 of crank arm assembly 280. In this manner, ring 290 rotates crank arm assembly 280 to the position shown in phantom lines in FIG. 8. Each hydraulic cylinder 295 includes a piston 296, cylinder 297 and piston rod 298. Cylinders 297 can be bolted, for example, to either plate 260 or power tong 270 housing.

Additional bracing such as a plurality of steel rods can be used to structurally interconnect housing 210 and plate 260. Such additional bracing could be used to relieve shear and torsional stresses acting upon cylinders 240.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:
1. A drill string safety valve operator, comprising:
   a. a rotatable tubular body having a longitudinal through bore for conveying fluids;
   b. a valve member movably disposed within the body for valving fluid flow through the bore;
   c. rotatable shaft means extending from and coupled to the valve member for moving the valve member to open or close the bore;
   d. bearing means connected for rotation with the shaft means for transmitting an applied load into rotation of the shaft means;
   e. upper and lower spaced apart annular surfaces positioned respectively above and below the bearing means and about the tubular body so that the respective surfaces can engage and move the bearing means in different respective directions; and
   f. normally non-rotating powered means supporting the upper and lower annular surfaces in a position about the housing and respectively above and below the bearing means for powering the annular surface means to move linearly with respect to the housing and between upper and lower positions so that a respective annular surface can effect an opening or a closing of the valve member.

2. The drill string safety valve operator of claim 1 wherein the rotatable shaft means comprises:
   a drive shaft member having a drive shaft axis and being connectable to the valve member; and
   a crank arm having a crank arm axis and being connected at one end to the drive shaft and extending therefrom.

3. A drill string safety valve operator of claim 2 wherein the drive shaft axis and arm axis form an angle.

4. The drill string safety valve operator of claim 3 wherein the angle is obtuse.

5. The drill string safety valve operator of claim 1 wherein the bearing means is capable of transmitting load to the crank arm means from a load transmitting surface which is both moving in a first direction toward the bearing means and in a second direction normal to the said first direction.

6. The drill string safety valve operator of claim 1 wherein the bearing means is rotatably connected to the crank arm means.

7. The drill string safety valve operator of claim 2 wherein the bearing means is a rotating roller bearing having an axis of rotation which forms an obtuse angle with the crank arm axis.

8. The drill string safety valve operator of claim 1 wherein the powered means includes one or more hydraulic pistons connected at one end to the tubular housing and at the other end to the annular surface means.

* * * * *